United States Patent
Zhang

(10) Patent No.: US 11,613,828 B2
(45) Date of Patent: Mar. 28, 2023

(54) ANIMAL LEATHER FIBER BUNDLES, YARNS, CORE-SPUN YARNS AND PRODUCTS WITH NANOSCALE BRANCHES

(71) Applicant: Guangdong Wuyuan New Material Technology Group Co., Ltd., Guangzhou (CN)

(72) Inventor: Liwen Zhang, Guangzhou (CN)

(73) Assignee: GUANGDONG WUYUAN NEW MATERIAL TECHNOLOGY GROUP CO., LTD., Guangzhou (CN)

( * ) Notice: Subject to any disclaimer, the term of this patent is extended or adjusted under 35 U.S.C. 154(b) by 108 days.

(21) Appl. No.: 17/269,165

(22) PCT Filed: May 29, 2020

(86) PCT No.: PCT/CN2020/093506
§ 371 (c)(1),
(2) Date: Feb. 17, 2021

(87) PCT Pub. No.: WO2020/239113
PCT Pub. Date: Dec. 3, 2020

(65) Prior Publication Data
US 2021/0324546 A1 Oct. 21, 2021

(30) Foreign Application Priority Data

May 27, 2019 (CN) .......................... 201910446876.1
May 22, 2020 (CN) ........................ 202010441933.X

(51) Int. Cl.
*D02G 3/10* (2006.01)
*D02G 3/32* (2006.01)
(Continued)

(52) U.S. Cl.
CPC ................. *D02G 3/10* (2013.01); *D02G 3/32* (2013.01); *D02G 3/449* (2013.01); *B82Y 40/00* (2013.01);
(Continued)

(58) Field of Classification Search
CPC ...... D06N 3/0018; D03D 15/233; D02G 3/10; D02G 3/32; D02G 3/449; B82Y 40/00; D10B 2211/06; D01F 4/00–06
See application file for complete search history.

(56) References Cited

U.S. PATENT DOCUMENTS

| | | | |
|---|---|---|---|
| 2006/0005735 A1 | 3/2006 | Ochi et al. | |
| 2010/0075143 A1 | 3/2010 | Hashimoto et al. | |
| 2014/0141229 A1* | 5/2014 | Yen | D03D 15/225 428/221 |

FOREIGN PATENT DOCUMENTS

| | | |
|---|---|---|
| CN | 2701881 Y | 5/2005 |
| CN | 101050602 A | 10/2007 |

(Continued)

OTHER PUBLICATIONS

"CN106592042_Machine Translation" is a machine translation of CN-106592042-A. (Year: 2017).*
(Continued)

*Primary Examiner* — Larissa Rowe Emrich
(74) *Attorney, Agent, or Firm* — Dinsmore & Shohl LLP

(57) ABSTRACT

An animal leather fiber bundle, yarn, core-spun yarn and products with nanoscale branches is disclosed. The animal leather fiber bundle with nanoscale branches has an animal leather fiber body, which is a spinnable animal leather fiber body. The animal leather fiber body has nanoscale branches, the yarn is formed of animal leather fiber bundles with nanoscale branches, the core-spun yarn has a core yarn and a skin layer, the skin layer has animal leather fiber bundles with nanoscale branches, and the product is made of any one
(Continued)

of the above. The disclosed structure has independent and separated nanoscale branches.

10 Claims, 5 Drawing Sheets

(51) Int. Cl.
*D02G 3/44* (2006.01)
*B82Y 40/00* (2011.01)
*D06N 3/00* (2006.01)

(52) U.S. Cl.
CPC ........ *D06N 3/0018* (2013.01); *D10B 2211/06* (2013.01); *D10B 2401/13* (2013.01); *D10B 2401/20* (2013.01)

(56) References Cited

FOREIGN PATENT DOCUMENTS

| | | | |
|---|---|---|---|
| CN | 101597865 | A | 12/2009 |
| CN | 101736478 | | 6/2010 |
| CN | 104032423 | | 9/2014 |
| CN | 104894695 | A | 9/2015 |
| CN | 106592042 | | 4/2017 |
| CN | 106592042 | A * | 4/2017 |
| CN | 206337353 | | 7/2017 |
| CN | 206337353 | U | 7/2017 |
| CN | 107429479 | A | 12/2017 |
| CN | 109082763 | A | 12/2018 |
| CN | 109098004 | | 12/2018 |
| CN | 111455515 | A | 7/2020 |
| EP | 1098024 | A1 | 5/2001 |
| JP | 2007532786 | | 11/2007 |
| JP | 2009150005 | A | 7/2009 |
| KR | 20190006466 | | 1/2019 |
| WO | 2004032713 | | 4/2004 |
| WO | 2017053433 | | 3/2017 |

OTHER PUBLICATIONS

China National Intellectual Property Administration, International Search Report issued in corresponding international application No. PCT/CN2020/093506, dated Aug. 27, 2020, 10 pp.
Matthews, Jamil, Electrospinning of Collagen Nanofibers, Biomacromolecules 2002, 3, 232-238, 7 pages.

* cited by examiner

ANIMAL LEATHER FIBER BUNDLES, YARNS, CORE-SPUN YARNS AND PRODUCTS WITH NANOSCALE BRANCHES

REFERENCE TO RELATED APPLICATIONS

This application is a U.S. national stage of PCT/CN2020/093506, filed May 29, 2020 which claims priority to Chinese patent application Nos. 201910446876.1, filed May 27, 2019 and 202010441933.X, filed May 22, 2020. The entire content of both of which is incorporated herein by reference.

TECHNICAL FIELD

The disclosure relates to animal leather fiber bundles, yarns and core-spun yarns, and particularly to animal leather fiber bundles, yarns and core-spun yarns with nanoscale branches.

BACKGROUND

The leather industry of the country is an integral part of the light industry, which includes three natural industries of leather, fur and leather products. The finished product of tanning is called leather, and leather is the leather products of de-haired animals. Fur is also called fur leather or fur coat, which is the leather products of animals with fur. Leather products are deep-processed products of leather or fur, such as leather shoes, leather clothing, leather goods, etc.

Tanning refers to a series of physical and chemical processing of raw hides to change the properties and appearance of raw hides to obtain leather.

The rawhide is peeled off from the animal body, and the rawhide mainly comprises the epidermis, dermis and subcutaneous tissue. Among them, the dermis layer is located under the epidermis layer, and its weight and thickness respectively account for more than 90% of the hide, which is the main part of the hide. The dermis is mainly composed of collagen fibers, elastic fibers and reticular fibers that are tightly woven and connected together. In addition, the dermis also contains some non-fibrous components, such as hair follicles, sweat glands, fat glands, fat cells, muscles, blood vessels, lymphatic vessels and fibrous interstitium.

The collagen fibers described above are the main fibers in the dermis, which constitute the main body of the rawhide. The collagen fibers are composed of collagen and account for 95%-98% of the total fiber weight of the dermis.

Collagen fibers do not branch, but gather into bundles. Its formation structure is as follows:

Pro-collagen molecule→protofibril (diameter 1.2~1.7 nm)→sub-fibril (diameter 3~5 nm)→fibril (diameter 20 nm)→thin fiber (diameter 2~5 μm)→collagen fiber (diameter 20~150 μm). The procollagen molecule is a right-handed composite helix structure formed by three left-hand helix collagen peptide chains. The collagen peptide chain is composed of helix chains and non-helical end peptides connected to them. Both helix and non-helical end peptides are composed of amino acid sequences. Although the amino acid composition and sequence of collagen vary according to different sources and types of collagen, the composition of several main amino acids is roughly the same, namely glycine, alanine, proline and hydroxyproline.

Pro-collagen molecule→protofibril (diameter 1.2~1.7 nm)→sub-fibril (diameter 3~5 nm)→fibril (diameter generally 20 nm)→thin fiber (diameter 2~5 μm)→collagen fiber (diameter 20~150 μm) is the formation process of collagen fibers, but there are no independent, separated collagen fiber bundles with nanoscale branches in the state of collagen fibers in animal skins or leather products.

The raw material "raw hides" for tanning has the following properties before being processed:

(1) The skin peeled off from the animal body is wet, it becomes hard after drying, and loses its turbulence and flexibility, and is easy to break when bent.

(2) The wet hides will quickly rot, shed hair, and stinks under hot and humid conditions.

(3) In hot water above 65° C., the hide will shrink. The higher the temperature, the greater the shrinkage.

(4) The air permeability and water vapor permeability of the hide are not good, that is, the hygiene is not good.

(5) Under the action of chemicals, the hides are easily destroyed.

Owing to the above properties of raw hides, raw hides cannot be directly made into daily necessities for people to use. Therefore, people make rinds into leather through a series of physical and chemical treatments. Although leather is obtained by physical and chemical treatment of raw hides, the morphology and structure of collagen fiber bundles in leather are basically the same as those in raw hides.

The leather obtained by processing the rawhide is favored by people because it does not become a hard and brittle material, does not rot, does not shrink, has good air and water vapor permeability, and has good chemical resistance. However, when leather is made into leather products, there will be a lot of leftovers. According to statistics, the country produces 1.4 million tons of leather leftovers every year in the tanning and leather products industry; India produces 150,000 tons of leather leftovers every year; the United States produces 60,000 tons of chromium-containing leather waste every year. These leather leftovers are one of the important factors that cause serious pollution in the leather industry.

Based on the large production of leather leftovers, since the 1980s, owing to the increasingly stringent environmental protection regulations in developed countries, the reduction of the places that can be used to fill leather scraps, and the high cost of pollution control, on the one hand, developed countries have transferred their polluting industries to developing countries; on the other hand, the research and application of leather scrap recycling are also actively carried out. Especially since the 1990s, with the increasingly severe global ecological problems such as resources and environment, the development of the leather industry is facing the challenge of "sustainable development" strategy. Therefore, the resource utilization of leather leftovers has become an important subject at home and abroad.

The history of recycling leather leftovers is long, but in the past, it has not attracted widespread attention from insiders and outsiders. In the past 20 years, with the development of molecular biology and the deepening of people's understanding of collagen and its properties, its application fields have become more extensive; therefore, the resource utilization of leather leftovers is no longer just the use of waste dander to produce low-value-added products such as recycled leather, but is given new content, that is, to strive for high-value-added conversion. The collagen fiber is an important functional substance that constitutes an animal body, and it has unparalleled biocompatibility and biodegradability of other synthetic polymer materials. Therefore, the importance and economic status of collagen fiber (i.e. animal leather fiber) as a natural biomass resource in food, medicine, cosmetics, feed, fertilizer and other industries are becoming increasingly prominent.

Based on the above background, the applicant has conducted in-depth research on the reuse of leather scraps, and applied for domestic and foreign patents, and put it into actual production. For example, the Chinese patent application numbers are 200410034435.4, 200410090255.8, 200410097268.8, 200410097268.8, 200510036778.9, 200710003092.9, 200710090219.5, 201010211811.8, 201020236921.5, 201621302339.8, etc. all involve collagen fibers. The above-mentioned collagen fibers studied by the applicant are obtained by gradually loosening the leather leftovers or the collagen fibers in the leather under the woven state under the hydraulic action of the liquid decomposer. However, in the previous research and implementation, only the leather leftovers or the collagen fibers in the leather were loosened to form animal leather fibers with a main body and gradually branching. In the research, it is found that nano-scale materials will produce unique properties of the same non-nano-scale materials. Therefore, the research and implementation of independent and separated nano-scale animal leather fiber branches and their processing methods are of great significance.

For this reason, some people have begun to study natural nanofibers. For example, a patent document of Chinese Patent Application No. 200510086251.7 with the publication date Feb. 8, 2006 discloses a method for preparing natural nanofibers, and specifically discloses the following steps:

(1) Soak the natural biological material in a container of a certain solvent.

(2) Turn on an ultrasonic device with a certain frequency and certain power, and insert the ultrasonic transmitter probe into the container filled with the natural biological material solution for a certain time of ultrasonic dissociation, thereby preparing a natural nanofiber. The natural biological materials include spider silk, silkworm silk, wild silk, wool, fish scales, bamboo fibers, collagen fibers, and wood fibers.

In the above-mentioned documents, it is disclosed that natural nanofibers can be obtained from collagen fibers, but those skilled in the art know that collagen fibers are distributed in bone tissue, and the protein constituting collagen fibers is type I collagen. Type I collagen constitutes bone collagen. Type I bone collagen has more than 3000 amino acids and a molecular weight of 95000, which is different from connective tissue and type I collagen in chemical structure. Type I bone collagen has fewer cross-linking sites, and the cross-linking is a structure formed after G-aldehyde lysine is reduced by sodium borohydride. The anterior N-terminal extension peptide of type I bone collagen was phosphorylated, while no translationally modified procollagen was found in connective tissue. In terms of amino acid composition, bone collagen is also different from cartilage collagen. It contains two special amino acids, namely serine and glycine. A large amount of serine exists in the form of phosphoserine, so the combination of phosphate and collagen is important in the process of mineralization. In the process of bone matrix mineralization, hydroxyapatite combines with bone collagen to form normal bone. The type I bone collagen is cross-linked to form a bone matrix framework; the quality and quantity of bone collagen are also related to mineralization, maintaining a certain deposition ratio. The mineralization process also requires the participation of non-collagen proteins in the bone matrix, namely osteocalcin, matrix protein, etc. Type I collagen not only provides a structural place for osteocalcin, but also combines with non-collagen proteins such as osteocalcin to form a network scaffold, which provides basic conditions for bone mineralization.

In the process of practical research, the hydroxyapatite crystals can be seen distributed along the long axis of the collagen fibers on the ultra-thin bone slices without decalcification. Collagen fibers have poor compression resistance and elasticity. Hydroxyapatite crystals are fragile, but when the two are combined, they have great structural strength, so that bone tissue can obtain strong mechanical properties.

The collagen fiber in leather is also composed of collagen, but it is different from the collagen in bone collagen fiber, and the collagen fiber in leather has better compression resistance and elasticity, which shows that the collagen fiber in leather and the collagen fiber are in There are obvious differences in composition and performance.

The collagen fiber in leather is also composed of collagen, but it is different from the collagen in bone collagen fiber, and the collagen fiber in leather has better compression resistance and elasticity, which shows that there is a significant difference in composition and performance between collagen fibers and collagen fibers in leathers.

Therefore, it is of far-reaching significance to develop a method of separating animal leather collagen fiber bundles with nanoscale branches from leather to improve the performance of the separated animal leather fiber bundles.

SUMMARY

The first object of the present invention is to provide an animal leather fiber bundle with nanoscale branches. In the animal leather fiber bundle structure of the present invention, the animal leather fiber bundle has independent, separated nanoscale branches attached to the main body of the animal leather fiber, showing the characteristics of good antibacterial effect, good adsorption performance and improved mechanical properties.

The second object of the present invention is to provide an animal leather fiber bundle yarn with nanoscale branches. In the yarn structure of the present invention, the animal leather fiber bundle has independent and separated nanoscale branches connected to the main body of the animal leather fiber, showing the characteristics of good antibacterial effect, good adsorption performance, and improved mechanical properties.

The third object of the present invention is to provide an animal leather fiber bundle core-spun yarn with nanoscale branches. In the core-spun yarn structure of the present invention, the animal leather fiber bundle has an independent and separated nanoscale branch connected to the main body of the animal leather fiber, showing the characteristics of good antibacterial effect, good adsorption performance and improved mechanical properties.

The fourth object of the present invention is to provide a product with nano-scale branched animal leather fiber bundles. The animal leather fiber bundle has independent and separated nanoscale branches in the product connected to the main body of the animal leather fiber, showing the characteristics of good antibacterial effect, good adsorption performance, and improved mechanical properties.

In order to achieve the above-mentioned first object, an animal leather fiber bundle with nanoscale branches comprises an animal leather fiber main body, which is a spinnable animal leather fiber body; and has nanoscale branches on the animal leather fiber body.

Further, the nano-scale branches comprise nano-scale branches with a diameter of 200 nm or less.

Animal leather fiber bundles with nanoscale branches are spinnable fiber bundles with nanoscale branches, which are formed by liquid defibrillation, opening and carding of animal leather. Compared with the protofibrils, sub-fibrils, and fibrils in the process of collagen fiber formation, the nanoscale branches exist independently and separately and are attached to the main body of the animal leather fiber, which is obviously different from the morphological structure of primary fibrils, sub-fibrils, and fibrils in quantity per unit length. For the animal leather fiber bundles with nanoscale branches, the specific surface area of the nanoscale branches is significantly increased, so that the animal leather fiber bundle has its own performance and new functions, that is to say, a great adsorption function is achieved. The adsorption function is achieved due to the generation of independent and separated nanoscale branches attached to the main body of the animal leather fiber, and the animal leather fiber bundle is formed by the amino acid sequence to form a peptide chain. Then the peptide chain forms collagen molecules. This special component in the animal leather fiber bundle makes the animal leather fiber bundle have a "blue shift" in the optical properties, and therefore, has a stronger ability to absorb ultraviolet light. Based on the improved UV absorption capacity of animal leather fiber bundles with nanoscale branches, and through testing and comparison, its antibacterial effect is very good, and it can achieve a sterilization rate of more than 95%, which greatly exceeds the antibacterial properties of existing fiber materials performance.

Liquid defibrillation is the extraction of animal leather fiber bundles from leather or leather leftovers under the mechanical action of the rotor of the liquid defibrillation machine and the hydraulic shear caused by the rotation of the rotor. Specifically, during the rotation of the rotor of the liquid defibrating machine, on the one hand, the blades on the rotor interact with leather or leather leftovers, causing friction and other forces to be generated between the leather or leather leftovers and the rotor. On the other hand, because the strong vortex is generated by the rotor, a high-speed turbulent area is formed around the rotor, and the flow rate of the liquid in each area is different, so the leather or leather leftovers rub against each other, and finally the leather fiber bundle is extracted.

In addition, the collagen molecule is a right-handed composite helix of procollagen composed of three left-handed α-chains entangled with each other. This is the collagen helix, which is the secondary structure of collagen. The high stability of the secondary structure of collagen is mainly due to the inter-chain hydrogen bonds and intra-molecular and inter-molecular inter-chain covalent cross-linking. So far, the first confirmed cross-linking structures include Schiff base cross-linking and β-Aldol crosslinking and aldol histidine crosslinking, etc. For animal leather fiber bundles with nanoscale branches, nanoscale branches due to the increase in the number of surface atoms, insufficient atomic coordination and high surface energy, so that these surfaces atoms have high activity, are extremely unstable, and are easily combined with other atoms. Based on the covalent cross-linking between chains, nanoscale branches are easily combined with animal leather fibers and other nanoscale branches. At the same time, nanoscale branches are attached to the main body of animal leather fibers. The animal leather fiber bundle provides greater mechanical strength. It is easy to interweave between the animal leather fiber main body, the nanoscale branch, and the animal leather fiber main body and the nanoscale branch, thereby improving the mechanical properties such as the strength of the animal leather fiber bundle.

In order to achieve the above-mentioned second object, an animal leather fiber bundle yarn with nanoscale branches comprise animal leather fiber bundles with nanoscale branches, and the animal leather fiber bundles with nanoscale branches comprise animal leather fiber bodies and animal leather fibers. The main body is a spinnable animal leather fiber main body, and the animal leather fiber main body has branches and nanoscale branches. The animal leather fiber main body, the branches and the nanoscale branches are interlaced and twisted together in a longitudinal arrangement.

Further, the nano-scale branches comprise nano-scale branches with a diameter of 200 nm or less.

Furthermore, the animal leather fiber bundle yarn with nanoscale branches also comprises other textile fibers except the animal leather fiber bundle with nanoscale branches.

The animal leather fiber bundle yarn with nanoscale branches is formed by twisting animal leather fiber bundles with nanoscale branches. The animal leather fiber main body, branches and nanoscale branches are interlaced each other and twisted together in the longitudinal arrangement. The animal leather fiber bundles with nanoscale branches are spinnable fiber bundles formed by various processes such as liquid defibrillation, opening and carding. Compared with the protofibrils, sub-fibrils and fibrils in the process of collagen fiber formation, the nanoscale branches exist independently and separately and are attached to the main body of the animal leather fiber, which are obviously different from the morphology and structure of the protofibril, sub-fibril and fibril. For the animal leather fiber with nanoscale branches, the specific surface area of the nanoscale branches is significantly increased, so that the animal leather fiber exerts its own performance and also produces new functions, that is, a great adsorption function. The adsorption function is produced due to the generation of independent and separated nano-scale branches attached to the main body of animal leather fibers, and animal leather fiber bundles are formed by amino acid sequences to form peptide chains, and then the peptide chains form collagen molecules. This special ingredient in animal leather fiber bundles makes the animal leather fiber bundle have a "blue shift" in the optical properties, and therefore, has a stronger ability to absorb ultraviolet light. Based on the improved UV absorption capacity of animal leather fiber bundles with nanoscale branches, and through testing and comparison, its antibacterial effect is very good, and it can achieve a sterilization rate of more than 95%, which greatly exceeds the antibacterial properties of existing fiber materials performance.

Liquid defibrillation is the extraction of animal leather fiber bundles from leather or leather leftovers under the mechanical action of the rotor of the liquid defibrillation machine and the hydraulic shear caused by the rotation of the rotor. Specifically, during the rotation of the rotor of the liquid defibrating machine, on the one hand, the blades on the rotor interact with leather or leather leftovers, causing friction and other forces to be generated between the leather or leather leftovers or leather leftovers and the rotor. On the other hand, due to the strong vortex generated by the rotor, a high-speed turbulent area is formed around the rotor, and the flow rate of the liquid in each area is different, so the leather or leather leftovers rub against each other, and finally the leather fiber bundle is extracted.

In addition, the collagen molecule is a right-handed composite helix of procollagen composed of three left-handed α-chains entangled with each other. This is the collagen helix, which is the secondary structure of collagen. The high stability of the secondary structure of collagen is mainly due to the inter-chain hydrogen bonds and intra-molecular and inter-molecular inter-chain covalent crosslinking. So far, the first confirmed cross-linking structures comprise Schiff base cross-linking and β-Aldol crosslinking and aldol histidine crosslinking, etc. For animal leather fiber bundles with nanoscale branches, nanoscale branches due to the increase in the number of surface atoms, insufficient atomic coordination and high surface energy, make these surface atoms have high activity, are extremely unstable, and are easily combined with other atoms. Based on the covalent cross-linking between the chains, when the animal leather fibers with nanoscale branches are interwoven by the twisting process, the nanoscale branches are easy to interact with the main body of the animal leather fiber and its branches and other nanoscale branches. At the same time, the nanoscale branches are attached to the animal leather fiber body. The animal leather fiber body provides greater mechanical strength for the animal leather fiber bundle. Besides, it is easy to interweave between the main body of animal leather fibers, between the nanoscale branches, and between the main body of animal leather fibers and the nanoscale branches, thereby improving the mechanical properties such as the strength of the yarn.

In order to achieve the third object, a core-spun yarn of animal leather fiber bundles with nanoscale branches comprises a core yarn, and the core yarn is covered with a skin layer formed by twisting animal leather fiber bundles with nanoscale branches. The animal leather fiber bundle with nanoscale branches comprises animal leather fiber main body, which is spinnable animal leather fiber main body. The animal leather fiber main body has branches and nanoscale branches, and the animal leather fiber main body, the branches and the nanoscale branches are interlaced with each other and twisted together in a longitudinal arrangement.

Further, the nano-scale branches include nano-scale branches with a diameter of 200 nm or less.

Further, the skin layer also comprises other textile fibers other than the animal leather fiber bundles with nanoscale branches.

Further, the core yarn is an elastic core yarn.

The animal leather fiber bundle core-spun yarn with nanoscale branches adopts the animal leather fiber bundles with nanoscale branches to form a skin layer by twisting and arranging in the longitudinal direction, making the animal leather fiber main body, branches and nanoscale branches interlace each other, and the skin layer is wrapped around the core yarn.

When combing the animal leather fiber bundle with nanoscale branches of the present invention, the more fully combed, the more the animal leather fiber bundles with nanoscale branches split, the more branches and nanoscale branches, and the finer the main body of the animal leather fiber and the more branches. Although the carded nanoscale branched animal leather fiber bundles become shorter, because more branches are produced, the nanoscale branched animal leather fiber bundles and their branches are aligned with the adjacent nanoscale branched animal leather fiber bundles and their branches through the spinning process. The adjacent nanoscale branched animal leather fiber bundles and their branches are intertwined and twisted to form a longitudinally arranged reticular structure. The more branches and nanoscale branches, the more complex the reticular structure. The larger the specific surface area of the nano-branched animal leather fiber bundles, the greater the friction between them, and the greater the cohesive force, which will increase the tensile strength and abrasion strength of the skin itself, so that the same count of yarn, nano-branched animal leather fiber bundles and their branches will increase. The more tangled and interlaced points, the better the yarn evenness, the higher the quality and performance, and the full use of the natural and unique structural characteristics of the nanoscale branched animal leather fiber bundle. Since the core yarn is provided, even if the nano-branched animal leather fiber bundles are carded into shorter nano-branched animal leather fiber bundles, the tensile strength of the core-spun yarn will not be affected. Therefore, the present invention solves the shortcomings of the fact that the prior art extracts animal leather fiber bundles from leather and directly spins the yarn to achieve the basic tensile strength, and solves the shortcomings that it is extremely difficult or impossible to process high count yarns.

The animal leather fiber bundles with nanoscale branches are spinnable fiber bundles formed by various processes such as liquid defibrillation, opening and carding. Compared with the protofibrils, sub-fibrils and fibrils in the process of collagen fiber formation, the nanoscale branches exist independently and separately, which are obviously different from the morphology and structure of the protofibrils, sub-fibrils, and fibrils. For animal leather fiber bundles with nanoscale branches, nanoscale branches, the specific surface area is significantly increased, so that the animal leather fiber exerts its own performance and also produces a new function, that is, a great adsorption function. The adsorption function is generated due to the independent and separated nanoscale branches, and the animal leather fiber bundle is composed of amino acid sequences to form peptide chains, and then the peptide chains form collagen molecules. This special composition in the animal leather fiber bundle makes the animal leather fiber bundle have a "blue shift" in optical properties. Therefore, the absorption capacity of ultraviolet light is stronger. Based on the improved UV absorption capacity of animal leather fiber bundles with nanoscale branches, and through testing and comparison, its antibacterial effect is very good, and the sterilization rate can reach more than 95%, which greatly exceeds the antibacterial properties of existing fiber materials performance.

Liquid defibrillation is the extraction of animal leather fiber bundles from leather or leather leftovers under the mechanical action of the rotor of the liquid defibrillation machine and the hydraulic shear caused by the rotation of the rotor. Specifically, during the rotation of the rotor of the liquid defibrating machine, on the one hand, the blades on the rotor interact with leather or leather leftovers, causing friction and other forces to be generated between the leather or leather leftovers and the rotor. On the other hand, due to the strong vortex generated by the rotor, a high-speed turbulent area is formed around the rotor, and the flow rate of the liquid in each area is different, so the leather or leather leftovers rub against each other, and finally the leather fiber bundle is extracted.

In addition, the collagen molecule is a right-handed composite helix of procollagen composed of three left-handed α-chains entangled with each other. This is the collagen helix, which is the secondary structure of collagen. The high stability of the secondary structure of collagen is mainly due to the inter-chain hydrogen bonds and intra-molecular and inter-molecular inter-chain covalent cross-linking. So far, the first confirmed cross-linking structures mainly comprise Schiff base cross-linking, β-Aldol cross-linking and aldol histidine crosslinking, etc. For animal leather fiber bundles with nanoscale branches, nanoscale branches due to the increase in the number of surface atoms, insufficient atomic coordination and high surface energy, so that these surface atoms have high activity, are extremely unstable, and are easily combined with other atoms. Based on the covalent cross-linking between the chains, when the animal leather fibers with nanoscale branches are interwoven together to form a skin layer by the twisting process, the nanoscale branches are easily combined with the body of the animal leather fiber and its branches and other nanoscale branches. At the same time, the nanoscale branches are attached to the main body of animal leather fibers. The main body of animal leather fibers provides greater mechanical strength for the animal leather fiber bundle. The animal leather fiber main body and the nanoscale branches are easy to interweave each other, thereby improving the mechanical properties such as the strength of the yarn.

The first technical solution for achieving the above-mentioned fourth object is a product with nano-scale branched animal leather fiber bundles, comprising the animal leather fiber bundle with nano-scale branches.

Further, it also comprises other textile fibers besides animal leather fiber bundles with nanoscale branches.

The second technical solution to achieve the above-mentioned fourth object is a product with nano-scale branched animal leather fiber bundles, comprising the animal leather fiber bundle yarn with nano-scale branches.

The third technical solution to achieve the fourth object is a product with nanoscale branched animal leather fiber bundles, comprising the animal leather fiber bundle core-spun yarn with nanoscale branches.

DETAILED DESCRIPTION

The present invention is described in further detail below in conjunction with the accompanying drawings and specific embodiments.

Embodiments 1

As shown in FIGS. 1 to 5, an animal leather fiber bundle with nanoscale branches comprises an animal leather fiber body 100. The animal leather fiber body is a spinnable animal leather fiber body; there are branches 101 and nanoscale branches 102 on the animal leather fiber body. Nanoscale branches comprise nanoscale branches with a diameter of 200 nm or less.

The animal leather fiber bundles with nanoscale branches are spinnable fiber bundles formed through various processes such as liquid defibrillation, opening and carding. Compared with the protofibrils, sub-fibrils, and fibrils in the process of collagen fiber formation, the nanoscale branches exist independently and separately and are attached to the main body of the animal leather fibers, which are distinctly different from the protofibrils, sub-fibrils, and fibrils in form and structure. For the animal leather fiber bundles with nanoscale branches, the specific surface area of the nanoscale branches is significantly increased, which makes the animal leather fiber bundles perform their own properties in addition to a new function, namely, a great adsorption function, which is generated due to the generation of independent and separated nanoscale branches attached to the main body of the animal leather fiber, and the animal leather fiber bundles are formed from amino acid sequences to form peptide chains, and then from the peptide chains to form collagen molecules, this special composition in animal leather fiber bundles makes the animal leather fiber bundles in the optical properties of the "blue shift" phenomenon. As a result, the absorption capacity of UV light is much stronger. Based on the nanoscale branches of the animal leather fiber bundles to improve the UV adsorption ability, and through testing and comparison, its antibacterial effect is very good, can achieve sterilization rate of more than 95%, which greatly exceeds the existing fiber material itself antibacterial performance.

Liquid defibrillation is to extract animal leather fiber bundles from leather or leather trimmings by the mechanical action of the rotor of the liquid defibrillator and the hydraulic shearing action caused by the rotor rotation. Specifically, during the rotation of the rotor of the liquid defibrillator, on the one hand, the blades on the rotor act with the leather or leather trimmings to produce friction and other forces between the leather or leather trimmings and the rotor, on the other hand, due to the strong worm rotation of the rotor, a turbulent area with high speed is formed around the rotor, resulting in different flow velocities of liquid in each area, so the leather or leather trimmings rub against each other and finally the leather fiber bundles are extracted.

Figure 2:
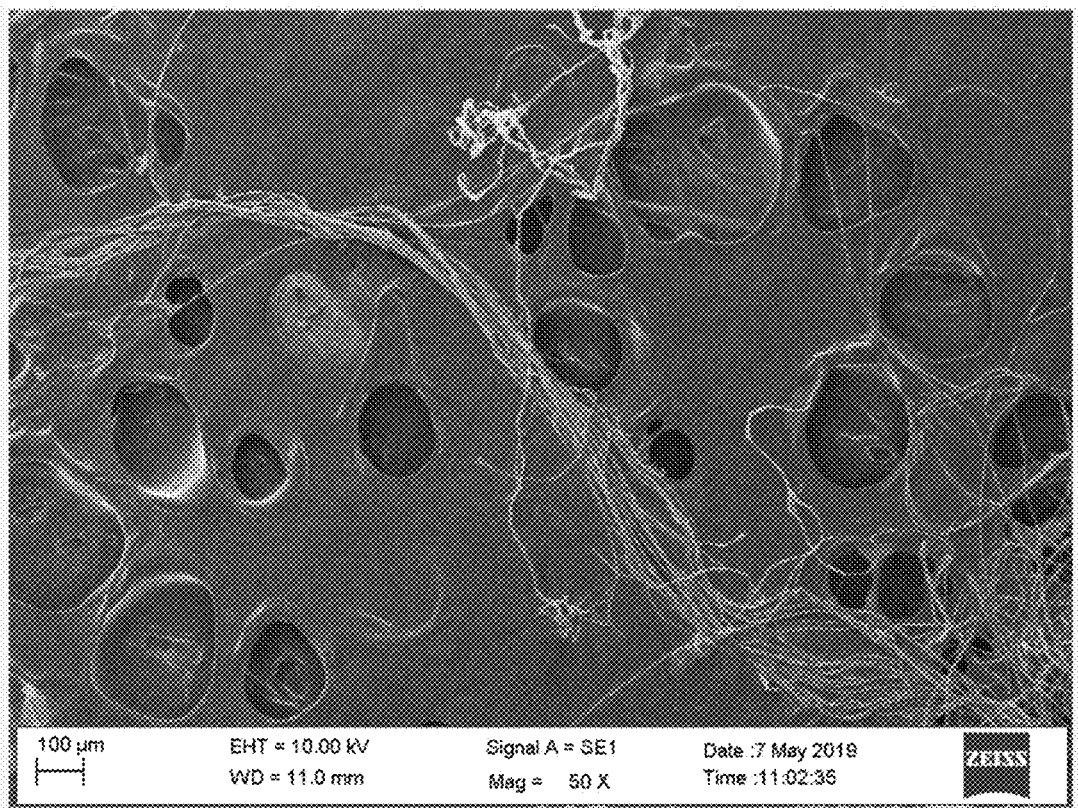
FIG. 2 is an electron micrograph of the animal leather fiber bundle before combing.
Figure 3:
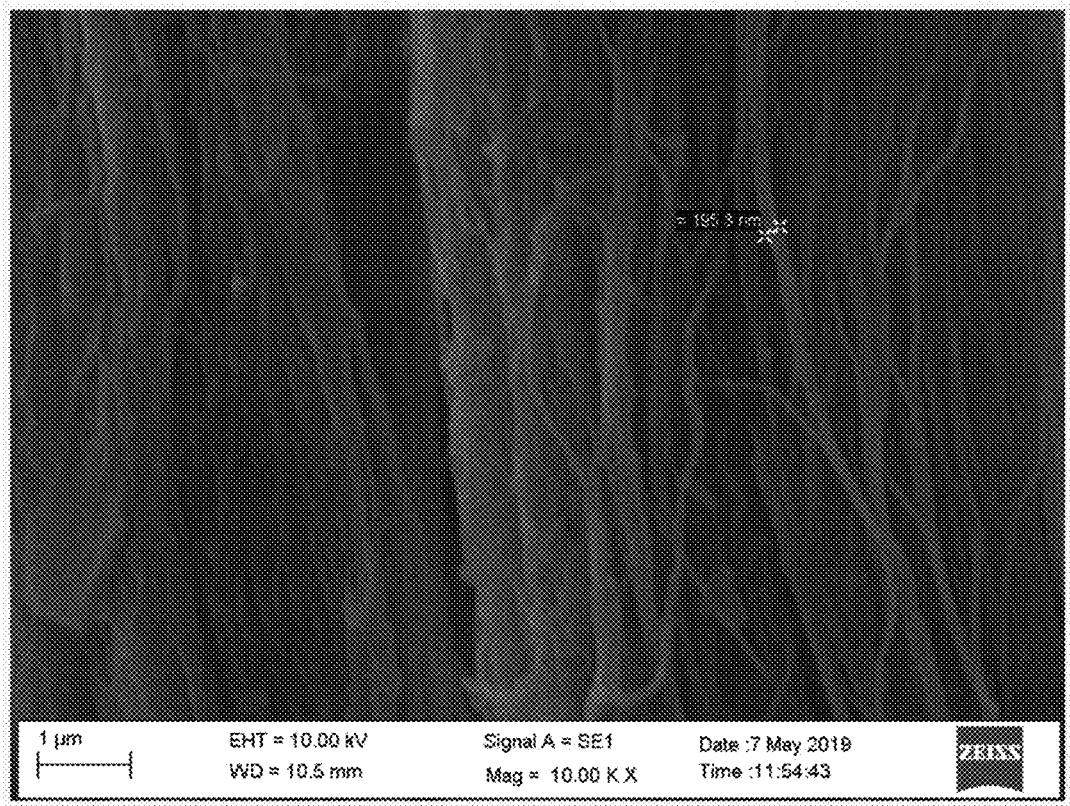
FIG. 3 is an electron micrograph of the animal leather fiber bundle with nanoscale branches after combing.
Figure 4:
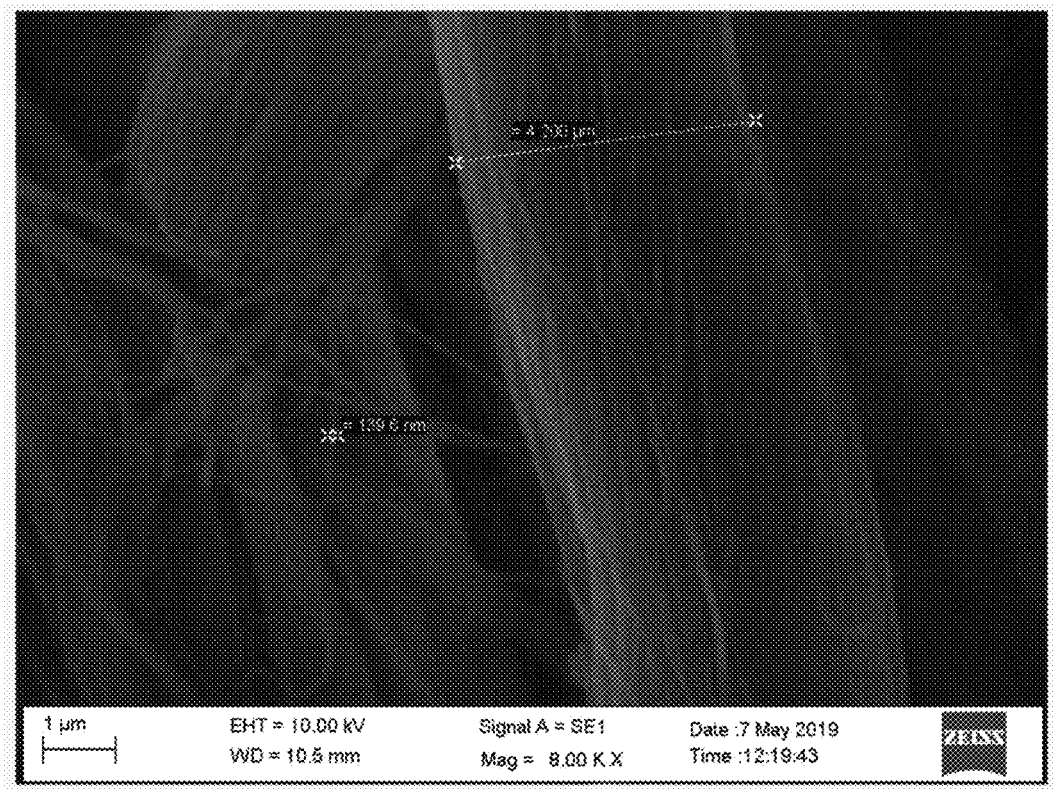
FIG. 4 is another electron micrograph of the animal leather fiber bundle with nanoscale branches.
Figure 5:
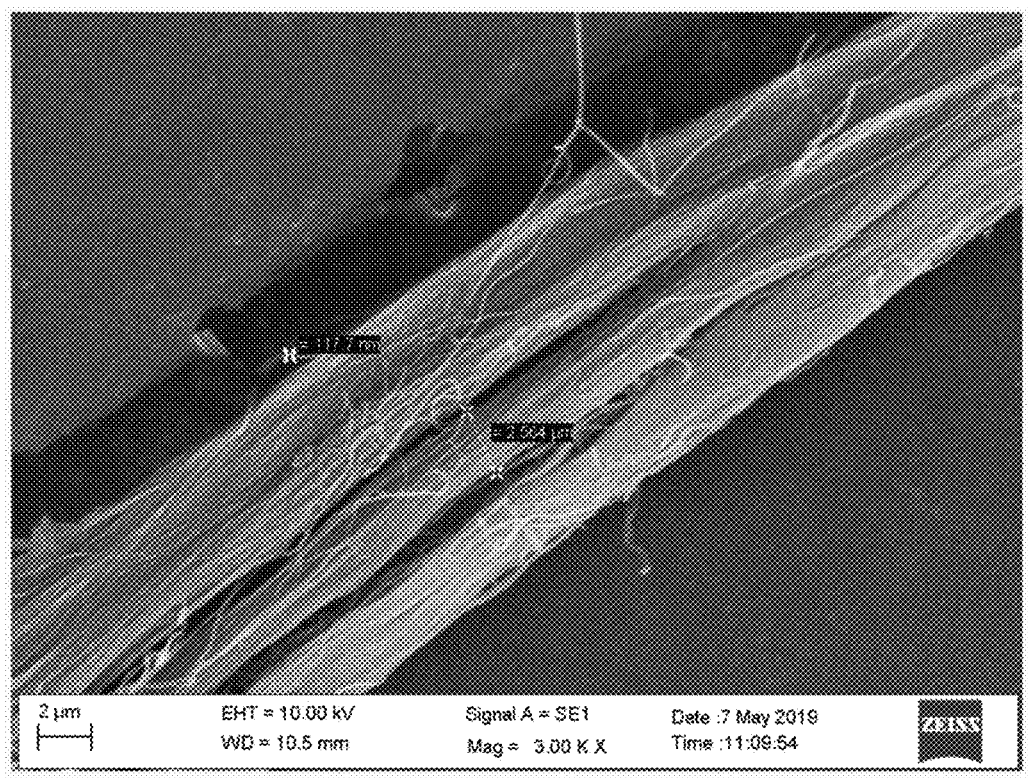
FIG. 5 is a third electron micrograph of an animal leather fiber bundle with nanoscale branches.

As can be seen in FIG. 2, before combing, animal leather fibers were basically presented with a coarser fiber bundle structure after being liquid defibrillated and opened, as shown in FIGS. 3 to 5, while by combing, nanoscale branches of animal leather fibers appeared, as can be seen from the electron micrographs, with 195.3 nm nanoscale branches in FIG. 3, 139.6 nm nanoscale branches in FIG. 4, and 117.7 nm nanoscale branches.

In addition, the collagen molecule is a right-handed composite helix of procollagen consisting of three left-handed alpha-chains intertwined with each other, which is the collagen helix, and this collagen helix is the secondary structure of collagen. The high stability of the collagen secondary structure is mainly due to interchain hydrogen bonding and interchain covalent cross-linking within and between molecules. So far, the first cross-linked structures that have been identified are mainly Schiff base cross-linking, β-hydroxyl aldehyde cross-linking and hydroxyl aldehyde histidine cross-linking. As for the animal leather fiber bundles with nanoscale branches, the nanoscale branches are highly reactive and extremely unstable due to the increased number of surface atoms, insufficient atomic coordination and high surface energy, which make these surface atoms highly reactive and easily combined with other atoms. Based on the inter-chain covalent cross-linking, the nanoscale branches are easily combined with the animal leather fiber and its other nanoscale branches. Meanwhile, the nanoscale branches are attached to the main body of animal leather fibers, and the main body of animal leather fibers provides the animal leather fiber bundles with a large mechanical strength, which in combination with the easy interweaving between the main body of animal leather fibers, between the nanoscale branches, and between the main body of animal leather fibers and the nanoscale branches, thus improving the mechanical properties such as the strength of the animal leather fiber bundles.

Embodiment 2

Figure 1:
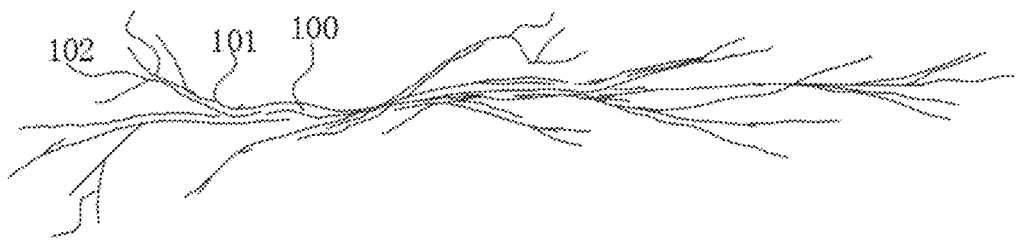
FIG. 1 is an animal leather fiber bundle with nanoscale branches.
Figure 6:
FIG. 6 is a schematic diagram of animal leather fiber bundle yarn with nanoscale branches.

As shown in FIG. 6, the animal leather fiber bundle yarn with nanoscale branching comprises an animal leather fiber bundle 3 with nanoscale branches. As shown in FIG. 1, the animal leather fiber bundle 3 with nanoscale branches comprises an animal leather fiber body 100, and the animal leather fiber body is a spinnable animal leather fiber body. The animal leather fiber body 100 has branches 101 and nanoscale branches 102, and the animal leather fiber body 100, branches 101 and nanoscale branches 102 are interlaced and twisted together in a longitudinal arrangement. Nanoscale branches comprise nanoscale branches with a diameter of 200 nm or less. Of course, it is possible to add other textile fibers to the animal leather fiber bundle yarn with nanoscale branches in addition to the animal leather fiber bundle with nanoscale branches.

Animal leather fiber bundle yarn with nanoscale branches is produced by twisting animal leather fiber bundles with nanoscale branches, so that the main body of animal leather fibers, branches and nanoscale branches are intertwined and arranged in the longitudinal direction. The animal leather fiber bundles with nanoscale branches are spinnable fiber bundles formed by various processes such as liquid defibrillation, opening and carding. Compared with the protofibrils, subfibrils and fibrils in the process of collagen fiber formation, the nanoscale branches exist independently and separately and are attached to the main body of animal leather fibers, which are distinctly different from the protofibrils, subfibrils and fibrils in form and structure. For the animal leather fiber bundle with nanoscale branches, the specific surface area of the nanoscale branches is significantly increased, which makes this animal leather fiber perform its own properties in addition to a new function, namely, a great adsorption function, which is generated due to the generation of independent and separated nanoscale branches attached to the main body of the animal leather fiber. The animal leather fiber bundle is formed by amino acid sequence to form peptide chain, and then from the peptide chain to form collagen molecules, this special composition in the animal leather fiber bundle makes the animal leather fiber bundle in the optical properties of the "blue shift" phenomenon, therefore, the absorption ability of ultraviolet light is stronger. Based on the nanoscale branches of the animal leather fiber bundle to improve the UV adsorption ability, and through testing and comparison, its antibacterial effect is very good, can achieve sterilization rate of more than 95%, which greatly exceeds the existing fiber material itself antibacterial performance.

Liquid defibrillation is to extract animal leather fiber bundles from leather or leather trimmings by the mechanical action of the rotor of the liquid defibrillator and the hydraulic shearing action caused by the rotor rotation. Specifically, during the rotation of the rotor of the liquid defibrillator, on the one hand, the blades on the rotor act with the leather or leather trimmings to produce friction and other forces between the leather or leather trimmings and the rotor, on the other hand, due to the strong worm rotation of the rotor, a turbulent area with high speed is formed around the rotor, producing different flow velocities of liquid in each area, so the leather or leather trimmings rub against each other and finally the leather fiber bundle is extracted.

In addition, the collagen molecule is a right-handed composite helix of procollagen consisting of three left-handed alpha-chains intertwined with each other, which is the collagen helix, and this collagen helix is the secondary structure of collagen. The high stability of the collagen secondary structure is mainly due to interchain hydrogen bonding and interchain covalent cross-linking within and between molecules. So far, the first cross-linked structures that have been identified are mainly Schiff base cross-linking, β-hydroxyl aldehyde cross-linking and hydroxyl aldehyde histidine cross-linking. As for the animal leather fiber bundles with nanoscale branches, the nanoscale branches are highly reactive and extremely unstable due to the increased number of surface atoms, insufficient atomic coordination and high surface energy, which make these surface atoms highly reactive and easily combined with other atoms. Based on the inter-chain covalent crosslinking, when the animal leather fibers with nanoscale branches are interwoven together by twisting process, the nanoscale branches are easily combined with the main body of animal leather fibers and its branches and other nanoscale branches. Meanwhile, the nanoscale branches are attached to the main body of animal leather fiber, and the main body of animal leather fiber provides a larger mechanical strength to the animal leather fiber bundle, which, together with the easy interweaving between the main body of animal leather fiber, between the nanoscale branches, and between the main body of animal leather fiber and the nanoscale branches, improving the mechanical properties of the yarn such as the strength.

Embodiment 3

Figure 7:
FIG. 7 is a schematic diagram of animal leather fiber bundle core-spun yarn with nanoscale branches.
Figure 8:
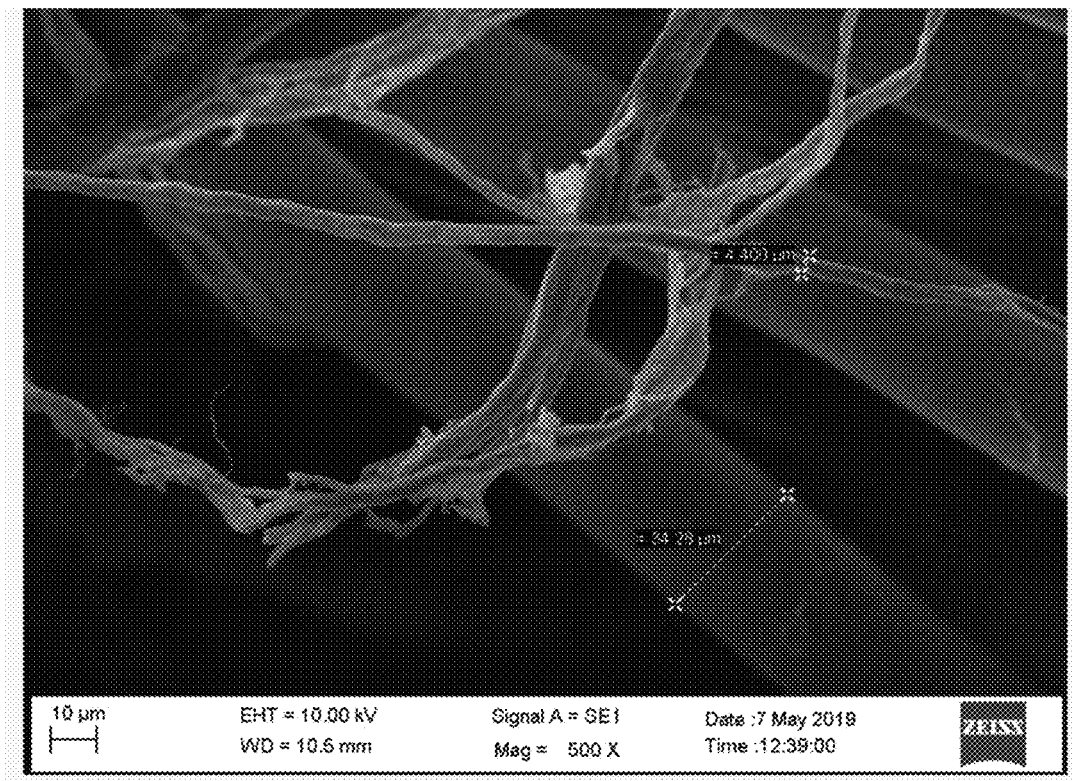
FIG. 8 is an electron micrograph of the animal leather fiber bundle core-spun yarn with nanoscale branches peeling off from the core yarn.

As shown in FIGS. 7 and 8, the animal leather fiber bundle core yarn with nanoscale branches comprises a core yarn 21 and the core yarn 21 is covered with a skin layer formed by twisting the animal leather fiber bundle 3 with nanoscale branches. As shown in FIG. 1, the animal leather fiber bundle with nanoscale branches comprises an animal leather fiber body 100, and the animal leather fiber body 100 is a spinnable animal leather fiber body. The animal leather fiber body has branches 101 and nanoscale branches 102, and the animal leather fiber body 100, branches 101 and nanoscale branches 102 are interlaced and twisted together in a longitudinal arrangement. In this embodiment, the core yarn can be an elastic core yarn, and the core yarn thus made has elasticity. The nanoscale branches comprise nanoscale branches with a diameter of 200 nm or less. Of course, other textile fibers other than animal leather fiber bundles with nanoscale branches can be added to the skin layer.

The core yarn of animal leather fiber bundles with nanoscale branches is formed by twisting animal leather fiber bundles with nanoscale branches to form a skin layer, so that the main body of animal leather fibers, branches and nanoscale branches are intertwined and arranged in the longitudinal direction, and the skin layer is wrapped around the core yarn.

When carding the animal leather fiber bundle with nanoscale branches of the present invention, the more adequate the carding, the more the animal leather fiber bundle with nanoscale branches splits, the more the branches and nanoscale branches, and the finer the main body of animal leather fibers, the finer the branches. Although the length of the animal leather fiber bundle with nanoscale branches after carding becomes shorter, due to the creation of more branches, through the twisting process of spinning, the nano-branched animal leather fiber bundles and their branches and the adjacent nano-branched animal leather fiber bundles and their branches are intertwined and twisted to form a reticular structure; the more the branches and nanoscale branches, the more complex the reticular structure is. The larger the specific surface area of nanoscale branches of animal leather fiber bundles, the greater the friction between them, and the greater the holding force, which will improve the tensile strength and abrasion resistance of the skin itself, so that for the same count of yarn, the more the animal leather fiber bundles with nanoscale branches, the more the intertwining points, the better the yarn stem, and the higher the quality and performance, making full use of the natural and unique structural characteristics of the animal leather fiber bundles with nanoscale branches. With the core yarn, the tensile strength of the core yarn is not affected even if the nano-branched animal leather fiber bundles are carded into shorter animal leather fiber bundles with nanoscale branches. Therefore, the present invention solves the problem that the existing technology of extracting animal leather fiber bundles from leather for spinning directly cannot reach the basic tensile strength, and solves the problem that it is extremely difficult to process high count yarn or cannot be processed at all.

The animal leather fiber bundles with nanoscale branches are spinnable fiber bundles formed by various processes such as liquid defibrillation, opening and carding. Compared with the protofibrils, subfibrils and fibrils in the process of collagen fiber formation, the nanoscale branches exist independently and separately and are attached to the main body of the animal leather fiber, which is distinctly different from the protofibrils, subfibrils and fibrils in form and structure. For the animal leather fiber bundle with nanoscale branches, the specific surface area of the nanoscale branches is significantly increased, which makes the animal leather fiber perform its own properties in addition to a new function, namely, a great adsorption function, which is generated due to the generation of independent and separated nanoscale branches attached to the main body of the animal leather fiber. The animal leather fiber bundle is formed by amino acid sequence to form peptide chain, and then from the peptide chain to form collagen molecules, this special composition in the animal leather fiber bundle makes the animal leather fiber bundle in the optical properties of the "blue shift" phenomenon, therefore, the absorption ability of ultraviolet light is stronger. Based on the nanoscale branches of the animal leather fiber bundle to improve the UV adsorption ability, and through testing and comparison, its antibacterial effect is very good, can achieve sterilization rate of more than 95%, which greatly exceeds the existing fiber material itself antibacterial performance.

Liquid defibrillation is to extract animal leather fiber bundles from leather or leather trimmings by the mechanical action of the rotor of the liquid defibrillator and the hydraulic shearing action caused by the rotor rotation. Specifically, during the rotation of the rotor of the liquid defibrillator, on the one hand, the blades on the rotor act with the leather or leather trimmings to produce friction and other forces between the leather or leather trimmings and the rotor, on the other hand, due to the strong worm rotation of the rotor, a turbulent area with high speed is formed around the rotor, producing different flow velocities of liquid in each area, so the leather or leather trimmings rub against each other and finally the leather fiber bundle is extracted.

In addition, the collagen molecule is a right-handed composite helix of procollagen consisting of three left-handed alpha-chains intertwined with each other, which is the collagen helix, and this collagen helix is the secondary structure of collagen. The high stability of the collagen secondary structure is mainly due to interchain hydrogen bonding and interchain covalent cross-linking within and between molecules. So far, the first cross-linked structures that have been identified are mainly Schiff base cross-linking, β-hydroxyl aldehyde cross-linking and hydroxyl aldehyde histidine cross-linking. As for the animal leather fiber bundles with nanoscale branches, the nanoscale branches are highly reactive and extremely unstable due to the increased number of surface atoms, insufficient atomic coordination and high surface energy, which make these surface atoms highly reactive and easily combined with other atoms. Based on the inter-chain covalent cross-linking, when the animal leather fibers with nanoscale branches are interwoven together to form a skin layer by twisting process, the nanoscale branches are easily combined with the main body of animal leather fiber and its branches and other nanoscale branches. Meanwhile, the nanoscale branches are attached to the main body of animal leather fiber, and the main body of animal leather fiber provides a larger mechanical strength for the animal leather fiber bundle, in addition to the easy interweaving between the main body of animal leather fiber, between the nanoscale branches, and between the main body of animal leather fiber and the nanoscale branches, thus improving the yarn's mechanical properties such as strength.

Embodiment 4

A product with nanoscale branches animal leather fiber bundles is manufactured from animal leather fiber bundles with nanoscale branches as described in Embodiment 1.

Embodiment 5

A product with nanoscale branches animal leather fiber bundles is manufactured from animal leather fiber bundle yarns with nanoscale branches as described in Embodiment 2.

Embodiment 6

A product with nanoscale branches animal leather fiber bundles is manufactured from the animal leather fiber bundle core yarn with nanoscale branches as described in Embodiment 3.

The above products can be clothing, hats, shoes, socks, gloves and other wearable items, as well as bedding, decorative materials, etc.

The following is the inhibition test report made by Guangdong Guangfang Testing and Measuring Technology Co., Ltd. commissioned by the applicant on Apr. 8, 2019, which was issued on Apr. 18, 2019, No. 19F02538, anti-counterfeiting code: VBTU-IN1L-S8, report anti-counterfeiting query URL: report.gztzs.com. The contents are as follows.

| Inspection items and test methods | Measured value | Standard values and tolerances for first-class products |
|---|---|---|
| Antibacterial effect- GB/T 20944.3-2008 (Oscillation method) | Bacteria inhibition rate: Staphylococcus aureus 96% E. coli 97% Candida albicans 95% (Sample has antibacterial effect) | Staphylococcus aureus ≥ 70% E. coli ≥ 70% Candida albicans ≥ 60% |
| Test results and conclusions | | |
| Inspection items | Scheduling basis | Judgment |
| Antibacterial effect | FZ/T 73023-2006 | Conformity |

From the test report, it shows that animal leather fiber bundles and yarns with nanoscale branches have very high anti-bacterial effect.

What is claimed is:

1. An animal leather fiber bundle with nanoscale branches, comprising:
    an animal leather fiber main body;
    wherein the animal leather fiber main body is a spinnable animal leather fiber main body,
    wherein the animal leather fiber body has independent, separated nanoscale branches attached to the animal leather fiber body, and
    the nanoscale branches comprise nanoscale branches with a diameter of 200 nm or less.

2. An animal leather fiber bundle yarn with nanoscale branches, comprising an animal leather fiber bundle with nanoscale branches, the animal leather fiber bundle with nanoscale branches comprising:
    an animal leather fiber body, the animal leather fiber body being a spinnable animal leather fiber body;
    wherein the animal leather fiber body has branches and independent, separated nanoscale branches attached to the animal leather fiber body; and
    the animal leather fiber body, branches and nanoscale branches are interlaced and twisted together in a longitudinal arrangement;
    the nanoscale branches comprise nanoscale branches with a diameter of 200 nm or less.

3. The animal leather fiber bundle yarn with nanoscale branches according to claim 2, wherein the animal leather fiber bundle yarn with nanoscale branches further comprises a blend of textile fibers other than the animal leather fiber bundle with nanoscale branches.

4. A core yarn of animal leather fiber bundles with nanoscale branches, comprising:
    a core yarn, wherein the core yarn is covered with a skin layer formed by twisting animal leather fiber bundles with nanoscale branches;
    the animal leather fiber bundles with nanoscale branches comprise an animal leather fiber body;
    the animal leather fiber body is a spinnable animal leather fiber body;
    the animal leather fiber body has branches and independent, separated nanoscale branches attached to the animal leather fiber body; and
    the animal leather fiber body, branches and nanoscale branches are interlaced and twisted together in a longitudinal arrangement;
    the nanoscale branches comprise nanoscale branches with a diameter of 200 nm or less.

5. The animal leather fiber bundle core yarn with nanoscale branches according to claim 4, wherein the skin layer further comprises a blend of textile fibers other than the animal leather fiber bundle with nanoscale branches.

6. The animal leather fiber bundle core yarn with nanoscale branches according to claim 4, wherein said core yarn is an elastic core yarn.

7. An article with nanoscale branches animal leather fiber bundles, wherein the article comprises animal leather fiber bundles with nanoscale branches as claimed in claim 1.

8. The article with nanoscale branches animal leather fiber bundles according to claim 7, wherein the article further comprises textile fibers other than animal leather fiber bundles with nanoscale branches.

9. An article with nanoscale branches animal leather fiber bundles, wherein the article comprises an animal leather fiber bundle yarn with nanoscale branches as claimed in claim 2.

10. An article with nanoscale branches animal leather fiber bundles, wherein the article comprises an animal leather fiber bundle core yarn with nanoscale branches as claimed in claim 4.

* * * * *